US008297155B2

(12) United States Patent
Hu

(10) Patent No.: US 8,297,155 B2
(45) Date of Patent: Oct. 30, 2012

(54) EXTENSION FOR WRENCH

(76) Inventor: Bobby Hu, Taichung (TW)

( * ) Notice: Subject to any disclaimer, the term of this patent is extended or adjusted under 35 U.S.C. 154(b) by 349 days.

(21) Appl. No.: 12/829,470

(22) Filed: Jul. 2, 2010

(65) Prior Publication Data

US 2011/0079117 A1 Apr. 7, 2011

(30) Foreign Application Priority Data

Oct. 2, 2009 (TW) ................................ 98133535 A

(51) Int. Cl.
*B26B 23/16* (2006.01)
*F16B 21/18* (2006.01)

(52) U.S. Cl. ....................................... 81/177.2; 403/328

(58) Field of Classification Search ................. 81/177.1, 81/177.2, 489, 184, 185.2; 403/109.1–109.8, 403/328; 16/427, 429
See application file for complete search history.

(56) References Cited

U.S. PATENT DOCUMENTS 4,440,517 A * 4/1984 Potter et al. .................. 81/177.2
6,006,634 A * 12/1999 Byers ........................... 81/177.2
* cited by examiner

*Primary Examiner* — Hadi Shakeri
(74) *Attorney, Agent, or Firm* — Alan Kamrath; Kamrath IP Lawfirm, PA

(57) ABSTRACT

A wrench includes a handle having first and second ends spaced along a longitudinal axis. The second end of the handle includes a receptacle extending in a radial direction perpendicular to the longitudinal axis. The handle further includes an annular groove intermediate the first and second ends along the longitudinal axis. The second end of the handle is slideably received in an extension. A positioning hole extends from an inner periphery through an outer periphery of the extension. A positioning member is mounted in the receptacle and biased by a spring to extend through the positioning hole, with a portion of the positioning member pressing against the inner periphery of the extension. A resilient retaining member is mounted in the annular groove. An exposed portion of the retaining member outside of the annular groove presses against the inner periphery of the extension when the extension is engaged with the handle.

6 Claims, 8 Drawing Sheets

EXTENSION FOR WRENCH

BACKGROUND OF THE INVENTION

1. Field of the Invention

The present invention relates to an extension for a wrench and, more particularly, to an extension reliably and releasably coupled to an end of a handle of a wrench.

2. The Prior Arts

Wrenches with a short handle are more useful than wrenches with a long handle in small spaces but provide small torque. To save costs, an extension is attached to the short handle of the wrench to increase the arm of force, and the extension can be detached to allow use of the wrench in a small space. FIG. 1 shows a conventional arrangement for coupling an extension 50 to an end 33 of a handle 39 of a wrench 30. Wrench 30 includes a head 31 with a drive portion 34 for coupling a socket for driving a fastener. End 33 includes a receptacle 331 receiving an engaging device 40 comprised of a positioning member 41 and a spring 42. Positioning member 41 includes a larger section and a smaller section having an outer diameter smaller than that of the larger section that is slideably received in receptacle 331. Extension 50 includes a tubular member 51 having an engaging portion 52 with a positioning hole 521. End 33 of handle 39 is inserted into tubular member 51. Spring 42 biases the smaller section of positioning member 41 into positioning hole 521 of tubular member 51 to position end 33 of handle 39 in tubular member 51. To allow easy coupling between tubular member 51 and handle 39, a spacing A (FIG. 2) must be provided between end 33 of handle 39 and an inner periphery of tubular member 51. However, end 33 of handle 39 wobbles in tubular member 51 due to existence of spacing A. Furthermore, spacing A becomes larger after a period of time of use, leading to undesired disengagement of positioning member 41 from positioning hole 521.

Thus, a need exists for an extension that can be reliably and releasably coupled to an end of a handle of a wrench to increase the arm of force.

SUMMARY OF THE INVENTION

The present invention solves this need and other problems in the field of increasing the arm of force for a wrench by providing, in a preferred form, a wrench includes a head having a drive portion adapted to drive an object. A handle has a first end interconnected to the head and a second end spaced from the first end along a longitudinal axis. The second end of the handle includes a receptacle extending in a radial direction perpendicular to the longitudinal axis. The handle further includes an annular groove on an outer periphery thereof and intermediate the first and second ends. A resilient retaining member is partially received in the annular groove of the handle. An extension includes a tubular member defining a longitudinal hole. The longitudinal hole has an opening in an end of the tubular member. The second end of the handle is slideably and releasably received in the longitudinal hole along the longitudinal axis via the opening. The tubular member has inner and outer peripheries spaced in the radial direction. The tubular member further includes a positioning hole extending from the inner periphery through the outer periphery of the tubular member and in communication with the longitudinal hole. A spacing between the positioning hole and the opening along the longitudinal axis is larger than a spacing between the receptacle and the annular groove along the longitudinal axis. A positioning member is slideably received in the receptacle in the radial direction. A spring is received in the receptacle. The spring biases the positioning member to partially extend through the positioning hole beyond the tubular member to couple the second end of the handle with the tubular member. A portion of the positioning member presses against the inner periphery of the tubular member. The positioning member is pushable in the radial direction to disengage from the positioning hole allowing disengagement of the tubular member from the handle. When the extension is engaged with the handle, an exposed portion of the retaining member outside of the annular groove of the handle presses against the inner periphery of the tubular member.

In the most preferred form shown, the tubular member further includes an annular retaining groove in the inner periphery of the tubular member and intermediate the positioning hole and the opening of the tubular member along the longitudinal axis. The exposed portion of the retaining member is received in the retaining groove when the extension is engaged with the handle. The retaining member is substantially C-shaped and includes a limiting section and two engaging sections on opposite sides of the limiting section. When the retaining member is outside of the tubular member, the engaging sections are partially outside of the annular groove while the limiting section is completely received in the annular groove. When the retaining member is received in the tubular member, the inner periphery of the tubular member presses against the engaging sections and urges the limiting section to expand radially outward to press against the inner periphery of the tubular member.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
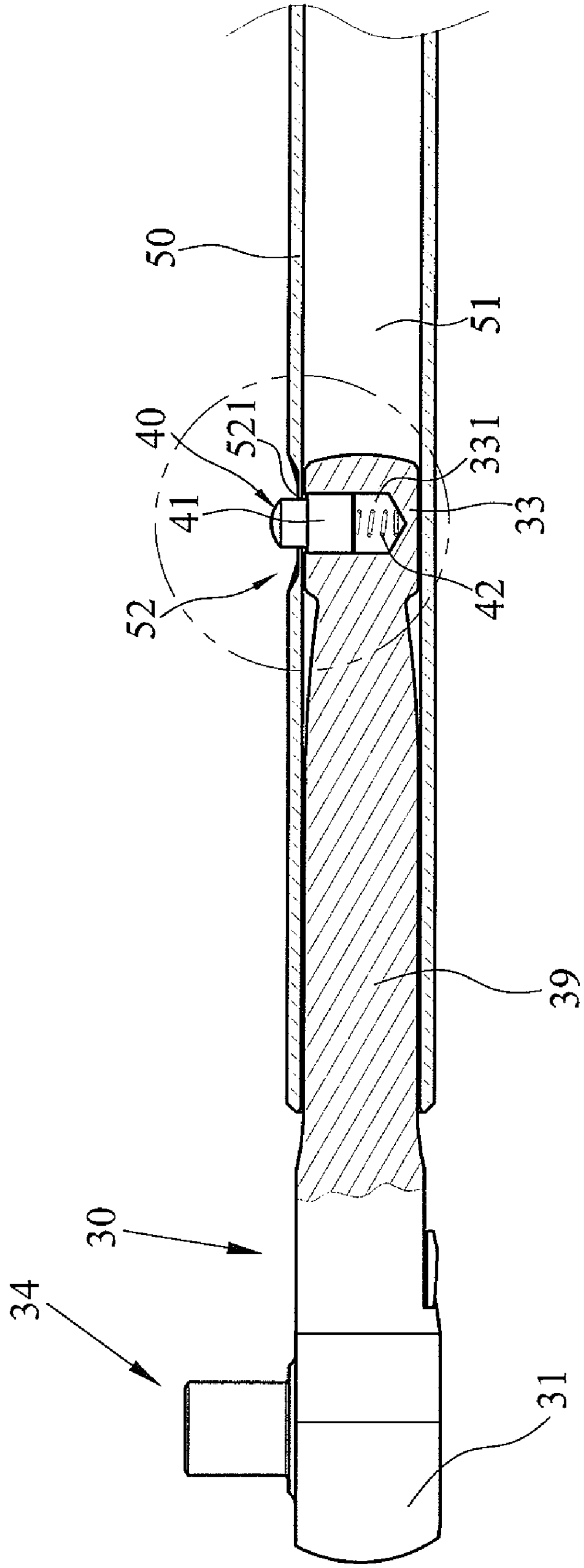
Fig. 1 Prior Art
FIG. 1 shows a partial, side view of a wrench and an extension according to the prior art, with a portion of the wrench and a portion of the extension sectioned.
Figure 2:
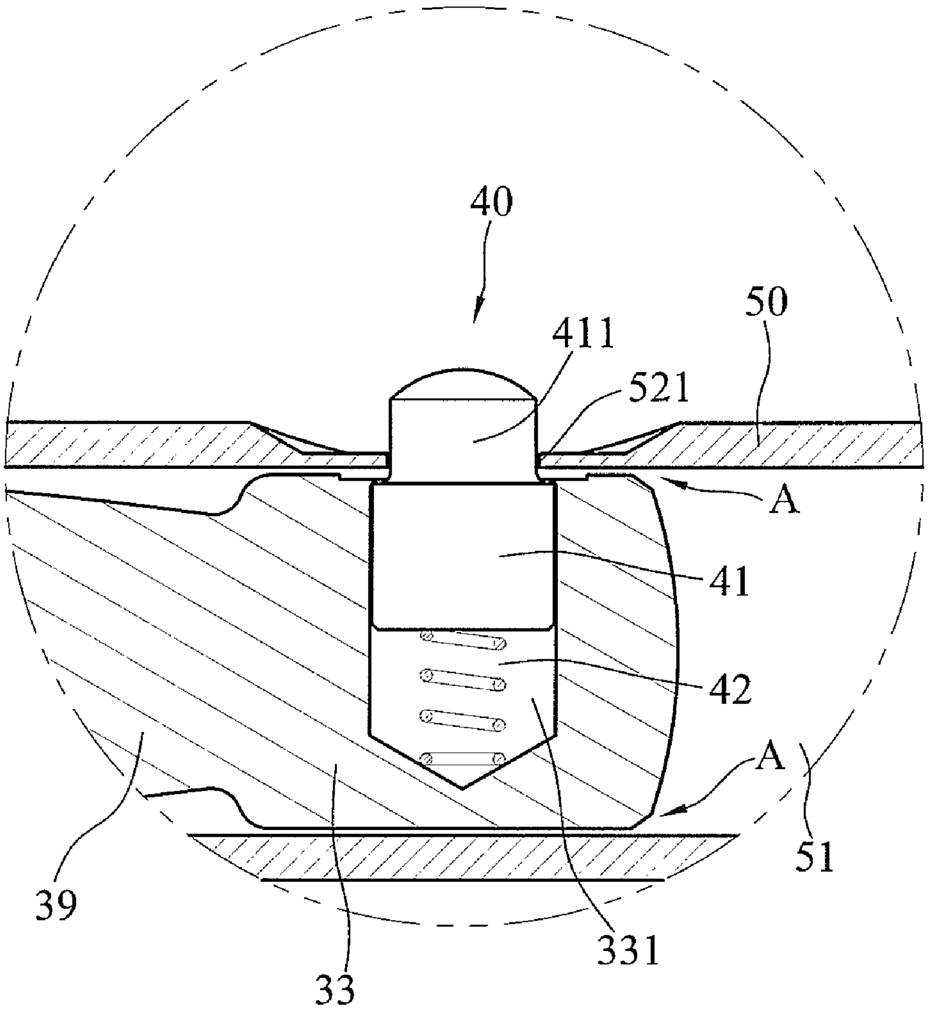
Fig. 2 Prior Art
FIG. 2 shows an enlarged view of a circled portion of FIG. 1.
Figure 3:
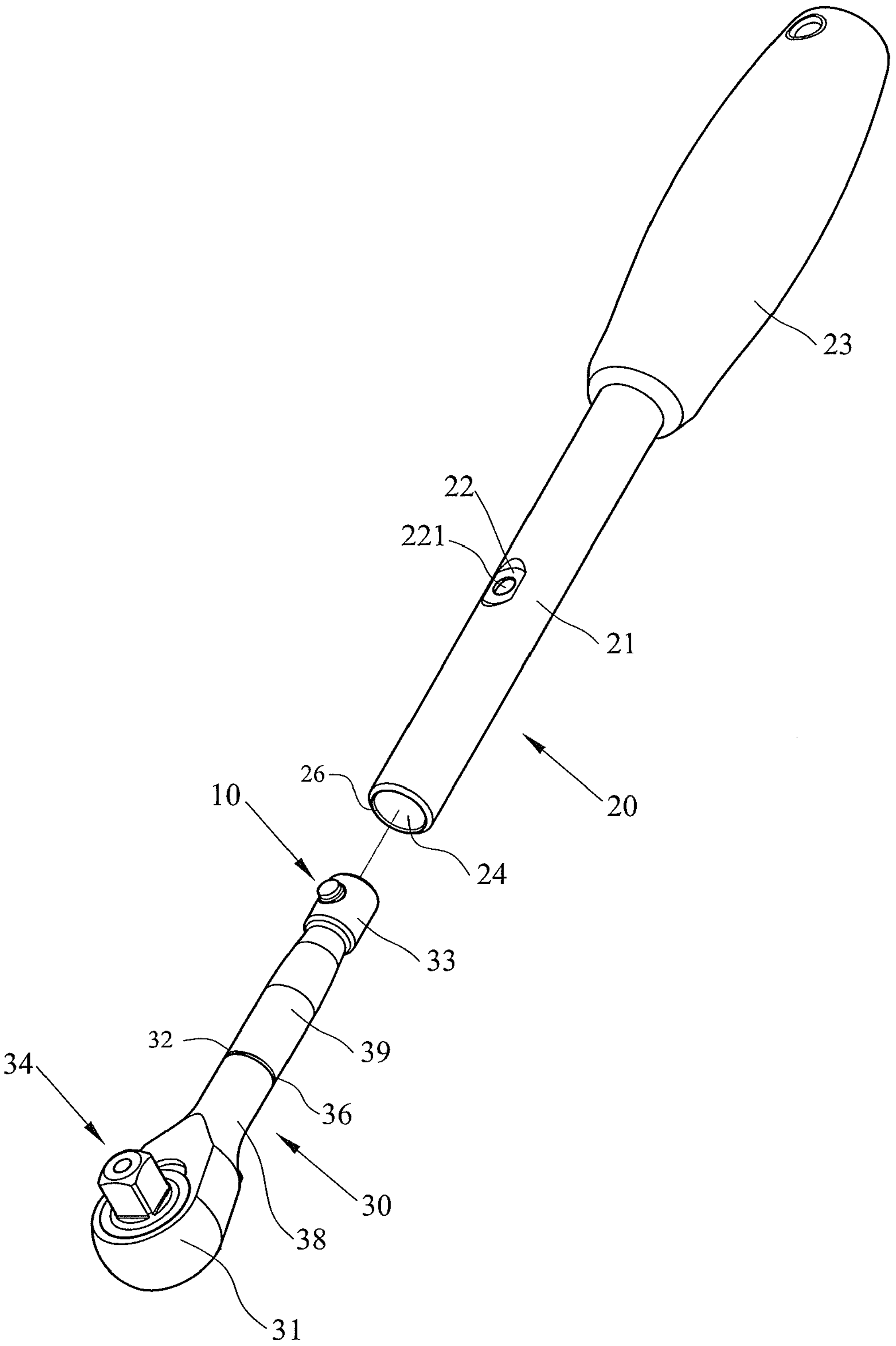
FIG. 3 shows an exploded, perspective view of a wrench and an extension according to the preferred teaching of the present invention.
Figure 4:
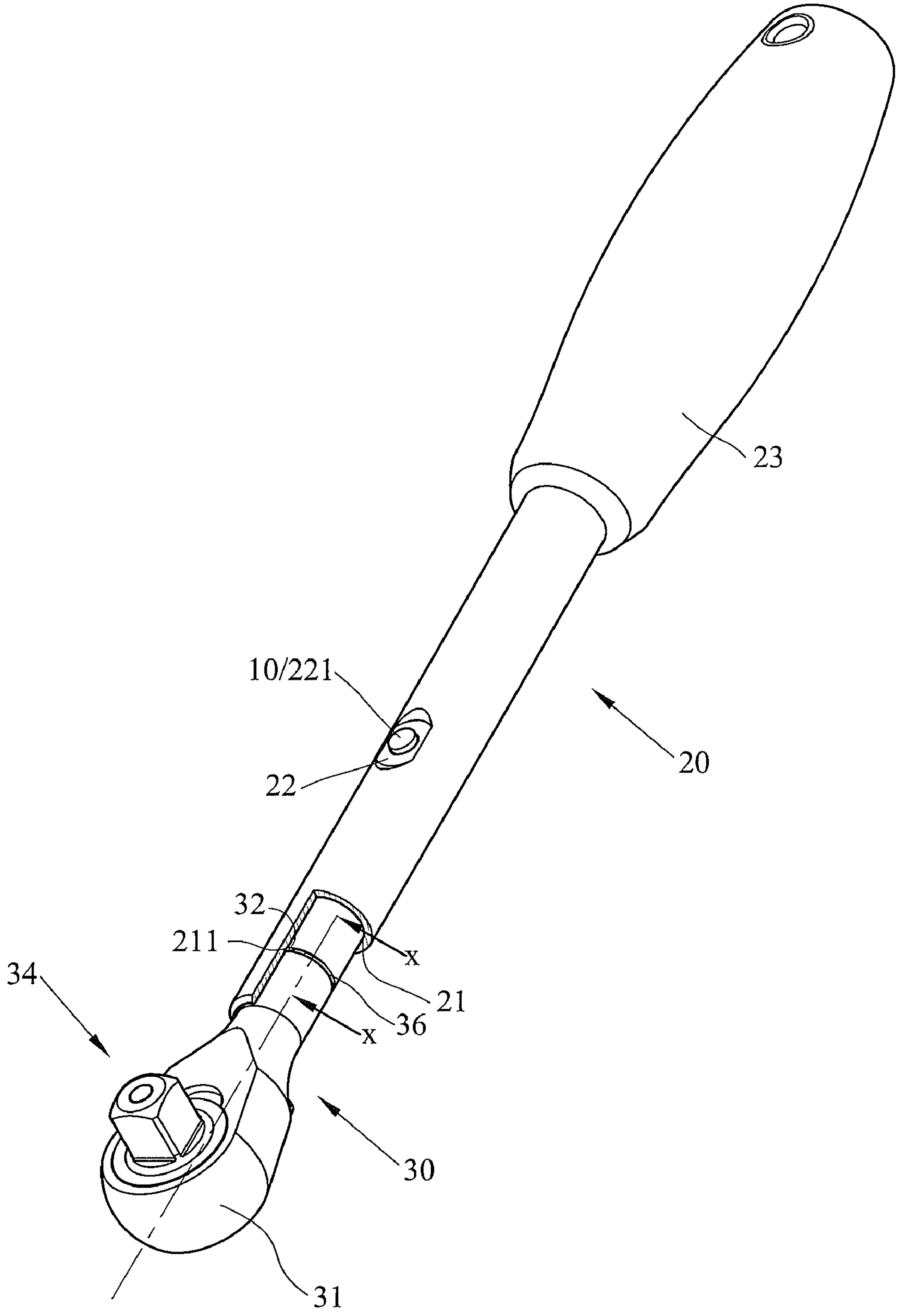
FIG. 4 shows a perspective view of the wrench and the extension of FIG. 3 with a portion of the wrench broken away.
Figure 5:
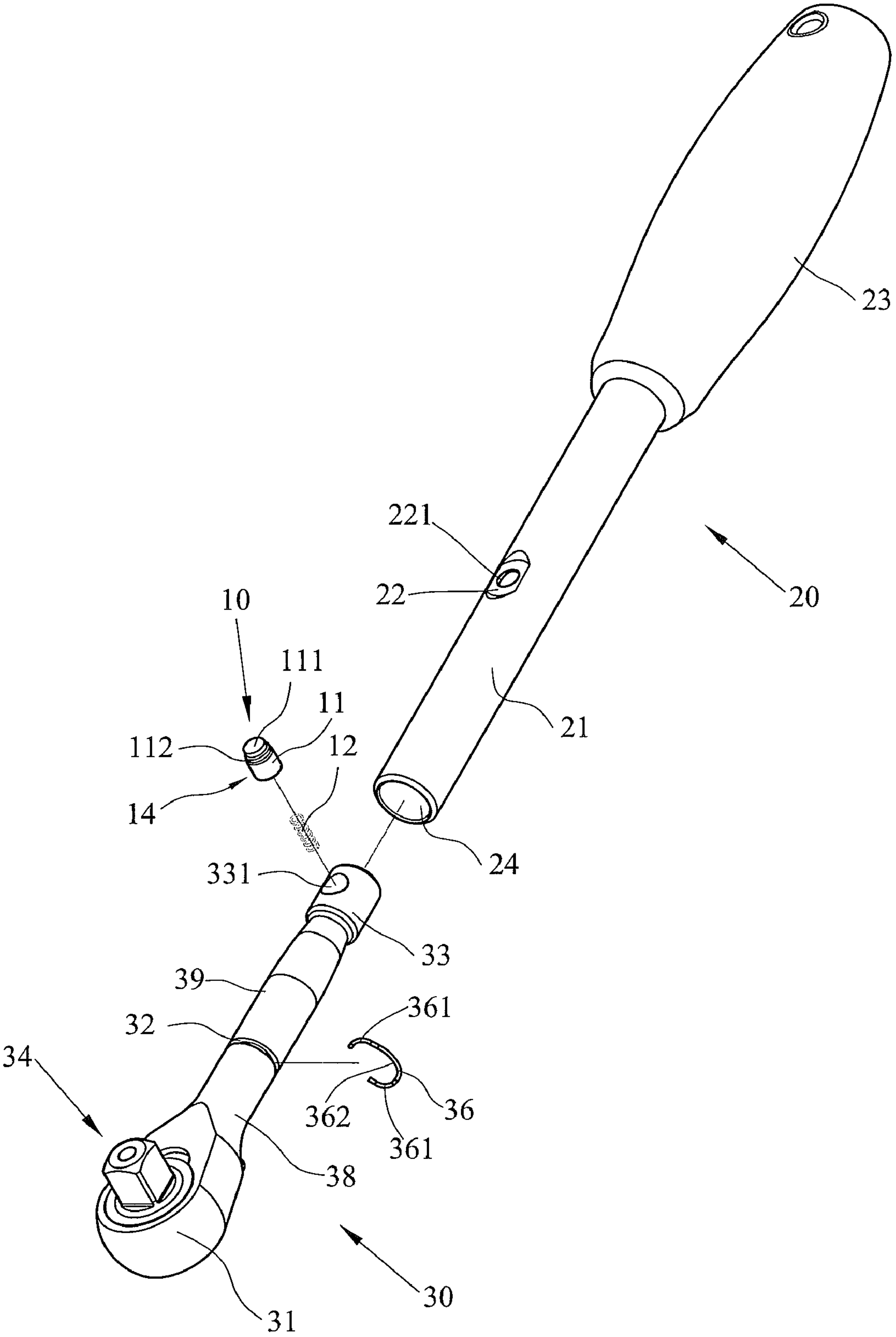
FIG. 5 shows another exploded, perspective view of the wrench and the extension of FIG. 3.
Figure 6:
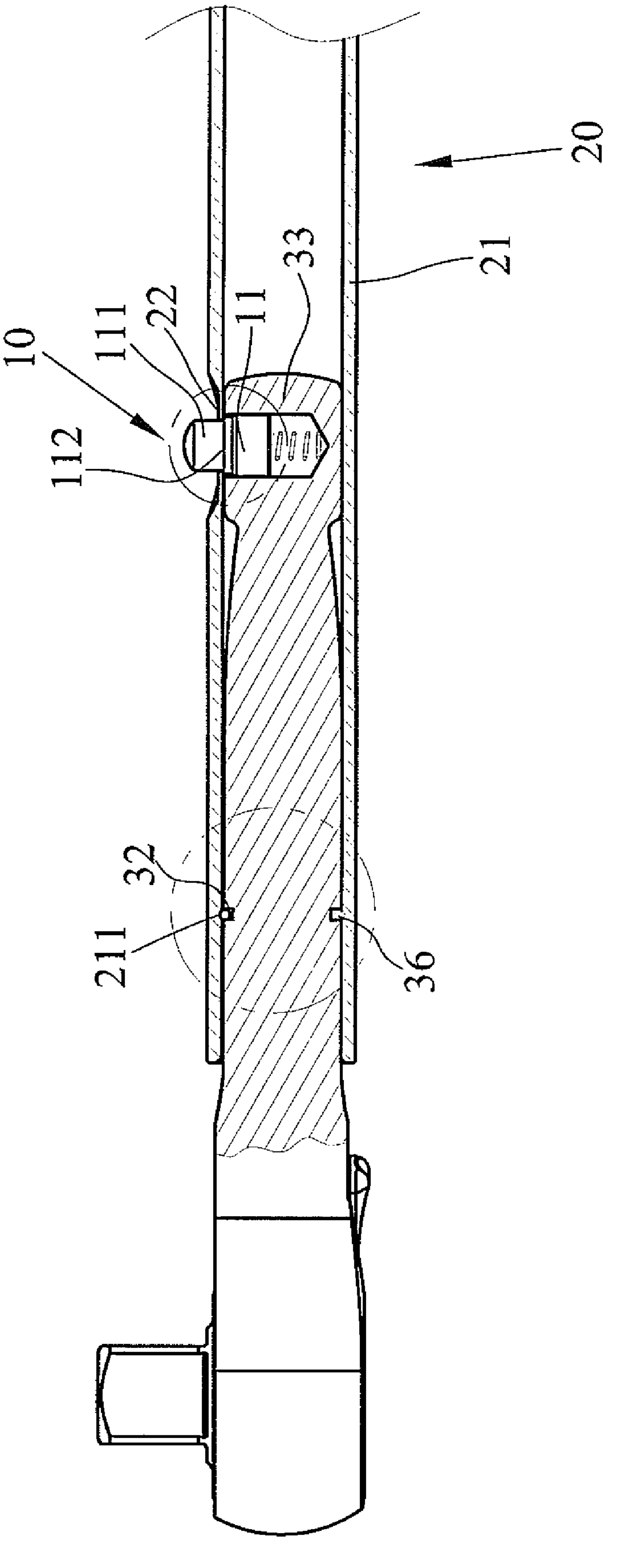
FIG. 6 shows a partial, side view of the wrench and the extension of FIG. 3, with a portion of the wrench and a portion of the extension sectioned.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "end", "portion", "section", "annular", "longitudinal", "radial", "inward", "spacing", "height", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENT

A combination of a wrench 30 and an extension 20 according to the preferred teachings of the present invention is shown in FIGS. 3-8. In the preferred form shown, wrench 30 includes a head 31 having a drive portion 34 in the form of a drive column releasably engageable with a socket for driving an object such as a bolt, a nut, etc. Other forms of drive portion 34 for directly or indirectly driving an object would be within the skill of the art. Wrench 30 further includes a handle 39 having a first end 38 interconnected to head 31 and a second end 33 spaced from first end 38 along a longitudinal axis. Second end 33 of handle 39 includes a receptacle 331 extending in a radial direction perpendicular to the longitudinal axis. Handle 39 further includes an annular groove 32 formed on an outer periphery thereof and intermediate first and second ends 38 and 33 along the longitudinal axis.

According to the preferred form shown, extension 20 includes a tubular member 21 defining a longitudinal hole 24. Longitudinal hole 24 has an opening 26 in an end of tubular member 21. A grip 23 is formed on the other end of tubular member 21. Second end 33 of handle 39 is releasably received in longitudinal hole 24 along the longitudinal axis via opening 26. Tubular member 21 has inner and outer peripheries spaced in the radial direction. Tubular member 21 further includes an engaging portion 22 having a positioning hole 221 extending from the inner periphery through the outer periphery of tubular member 21 and in communication with longitudinal hole 24. In the most preferred form shown, engaging portion 22 is recessed from the outer periphery of tubular member 21. A spacing between positioning hole 221 and opening 26 along the longitudinal axis is larger than a spacing between receptacle 331 and annular groove 32. Furthermore, the inner periphery of tubular member 21 has an annular retaining groove 211 intermediate opening 26 and positioning hole 221 along the longitudinal axis. A spacing between positioning hole 221 and retaining groove 211 along the longitudinal axis is equal to the spacing between receptacle 331 and annular groove 32 along the longitudinal axis.

According to the preferred form shown, a resilient retaining member 36 in the most preferred form shown as a C-clip is mounted in annular groove 32. Specifically, retaining member 36 includes a limiting section 362 and two engaging sections 361 on opposite sides of limiting section 362. A radius of each engaging section 361 is larger than a radius of limiting section 362.

Figure 7A:
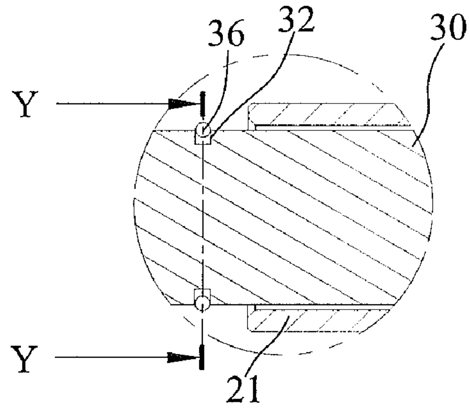
FIG. 7A is an enlarged view of a portion of the wrench and a portion of the extension of FIG. 3 according to section line X-X of FIG. 4 with a resilient retaining member on the handle outside of the extension.
Figure 7B:
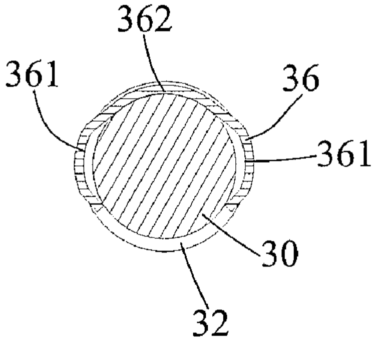
FIG. 7B shows a cross sectional view of FIG. 7A according to section line Y-Y of FIG. 7A.
Figure 7C:
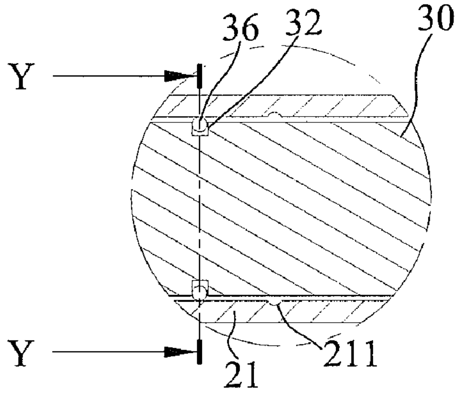
FIG. 7C is an enlarged view of a portion of the wrench and a portion of the extension of FIG. 3 according to section line X-X of FIG. 4 with the resilient retaining member inserted into the extension and not received in a retaining groove of the extension.
Figure 7D:
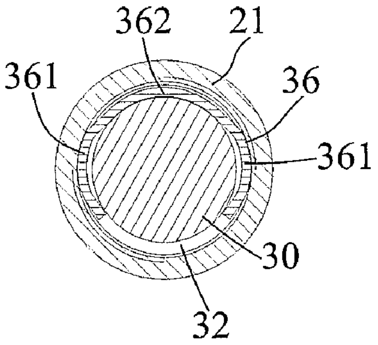
FIG. 7D shows a cross sectional view of FIG. 7C according to section line Y-Y of FIG. 7A.
Figure 7E:
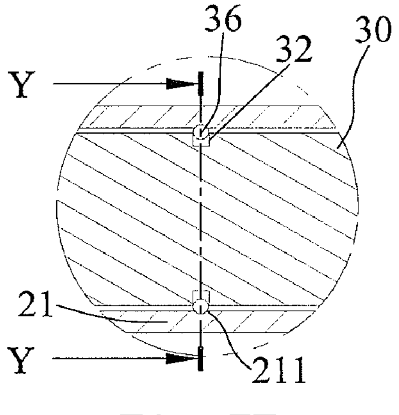
FIG. 7E is an enlarged view of a larger circled portion of FIG. 6 according to section line X-X of FIG. 4 with the resilient retaining member engaged in the retaining groove of the extension.
Figure 7F:
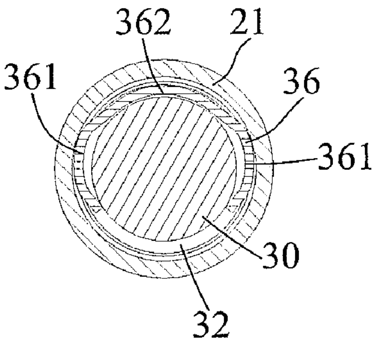
FIG. 7F shows a cross sectional view of the larger circled portion of FIG. 7E according to section line Y-Y of FIG. 7E.
Figure 8:
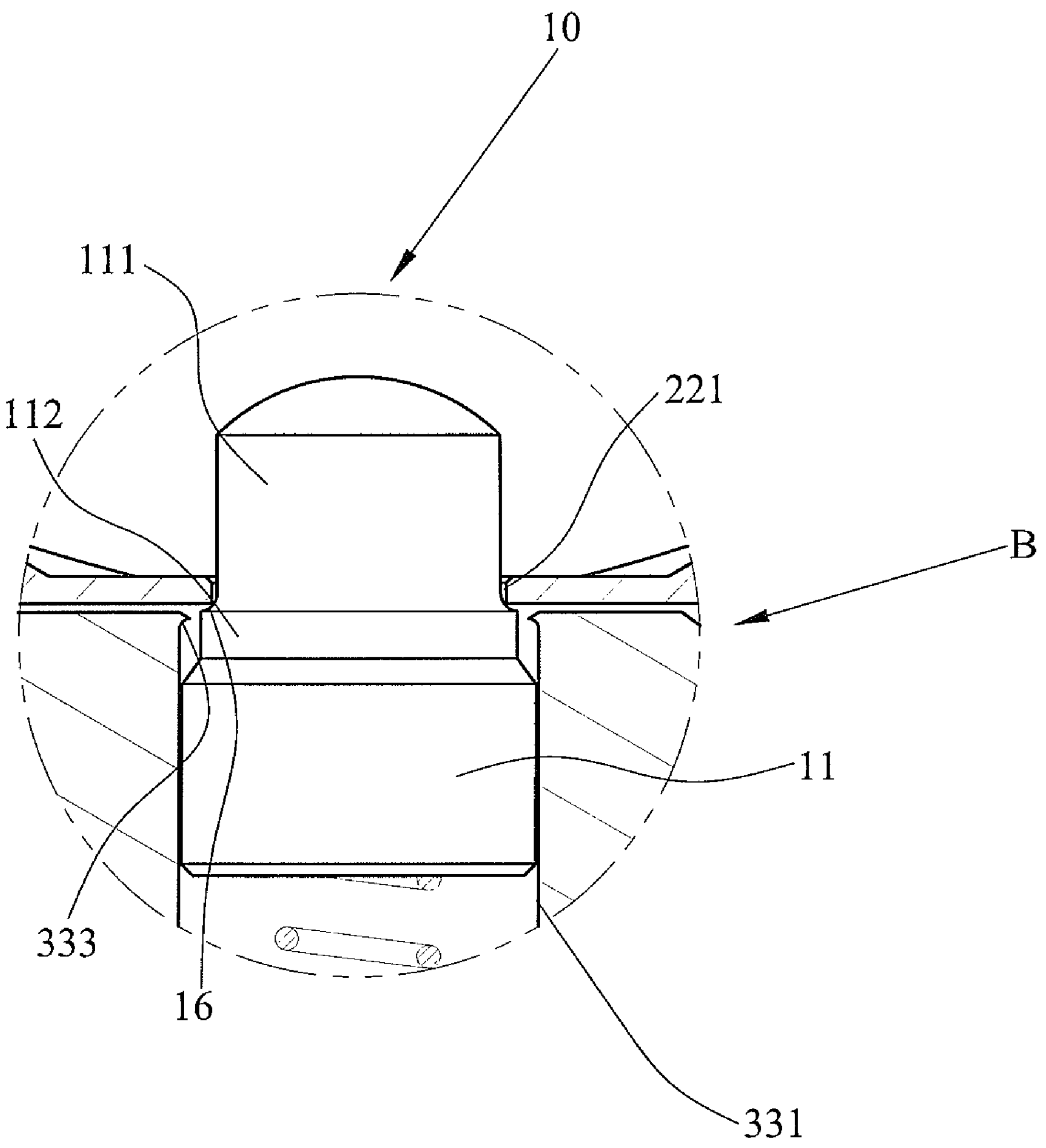
FIG. 8 shows an enlarged view of a smaller circled portion of FIG. 6.

With reference to FIGS. 7A and 7B, when retaining member 36 is outside of tubular member 21, engaging sections 361 are partially outside of annular groove 32 while limiting section 362 is completely received in the annular groove 32. With reference to FIGS. 7C and 7D, when retaining member 36 is received in tubular member 21, the inner periphery of tubular member 21 presses against engaging sections 361 of retaining member 36 and urges limiting section 362 to expand radially outward to press against the inner periphery of the tubular member 21. With reference to FIGS. 7E and 7F, when annular groove 32 is aligned with retaining groove 211, the exposed portions of retaining member 36 are received in retaining groove 211.

According to the preferred form shown, a positioning member 10 is mounted in receptacle 331. Positioning member 10 includes a body 11 and an engaging section 14. Engaging section 14 includes first and second sections 111 and 112. Second section 112 is intermediate first section 111 and body 11 in the radial direction. Body 11 is slideably received in receptacle 331 in the radial direction. Second section 112 has first and second ends spaced in the radial direction. The first end of second section 112 is interconnected to body 11. Second section 112 has an outer diameter smaller than body 11 and larger than a diameter of positioning hole 221. First section 111 has first and second ends spaced in the radial direction. The first end of first section 111 is interconnected to the second end of second section 112. First section 111 has an outer diameter smaller than second section 112 and slightly smaller than positioning hole 221, so that first section 111 slideably extends through positioning hole 221 in the radial direction. Furthermore, second end of second section 112 and first end of first section 111 form a shoulder 16 having an outer diameter smaller than the diameter of receptacle 331 and larger than the diameter of positioning hole 221.

After body 11 is received in receptacle 331, a peripheral edge 333 (FIG. 8) defining an opening of receptacle 331 can be processed to have a diameter slightly smaller than body 11 so that body 11 will not disengage from receptacle 331.

According to the preferred form shown, a spring 12 is received in receptacle 331. Spring 12 is mounted between a bottom wall of receptacle 331 and body 11.

With reference to FIGS. 7A-7F, when it is desired to attach extension 20 to handle 39 for increasing the arm of force applied to drive portion 34 of wrench 30, second end 33 of handle 39 is inserted into tubular member 21 with positioning member 10 moved radially inward by the inner periphery of tubular member 21 to overcome spring 12. When positioning hole 221 is aligned with first section 111 of positioning member 10, annular groove 32 of handle 39 is aligned with retaining groove 211 of extension 20. Spring 12 biases first section 111 of positioning member 10 to extend through positioning hole 221 with the second end of first section 111 outside of tubular member 21. Thus, second end 33 of handle 39 is coupled with tubular member 21. Furthermore, shoulder 16 presses against the inner periphery of tubular member 21 under action of spring 12 when engaging section 14 is received in positioning hole 221. At the same time, the exposed portions of retaining member 36 are received in retaining groove 211 of tubular member 21.

Thus, two radial retaining forces are respectively applied to two portions of the inner periphery of tubular member 21 spaced along the longitudinal axis of handle 39 by positioning member 10 and resilient retaining member 36, reliably retaining second end 33 of handle 39 in tubular member 21. Wobbling of second end 33 of handle 39 is minimized while providing a spacing B (FIG. 8) between the inner periphery of tubular member 21 and handle 39 to allow easy insertion and removal of handle 39 into and from tubular member 21. Reliable operation of the combination including wrench 30 and extension 20 to provide a larger arm of force is, thus, allowed.

It can be appreciated that engagement between retaining member 36 and the inner periphery of tubular member 21 is not adversely affected by the relative angular position between handle 39 and tubular member 21. When retaining member 36 is received in retaining groove 211 of tubular member 21, body 11 reaches the longitudinal location of positioning hole 221 even though body 11 may not be aligned with positioning hole 221 of handle 39. In a case body 11 is not aligned with positioning hole 221, one of handle 39 and tubular member 21 can be rotated relative to the other until body 11 aligns with positioning hole 221. Easy, precise coupling between wrench 30 and extension 20 is, thus, obtained.

When it desired to separate extension 20 from handle 39, the second end of first section 111 can be pushed in the radial direction to disengage from positioning hole 221, allowing disengagement of tubular member 21 from second end 33 of handle 39. Retaining member 36 will not adversely affect disengagement of extension 20 from handle 39. Thus, extension 20 can be detached from handle 39 when use of wrench 30 in a small space is required.

Retaining member 36 in the form of C-clip is simple in structure and can easily be mounted in annular groove 32 of handle 39. The costs for manufacturing retaining member 36 and for forming annular groove 32 in handle 39 are low. Furthermore, retaining groove 211 can be omitted if desired. In this case, the inner periphery of tubular member 21 presses against engaging sections 361 of retaining member 36 and urges limiting section 362 to expand radially outward to press against the inner periphery of the tubular member 21 when positioning member 10 is engaged in positioning hole 221. This also provides two radial retaining forces to two portions of the inner periphery of tubular member 21 spaced along the longitudinal axis of handle 39 by positioning member 10 and resilient retaining member 36.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A combination comprising, in combination:

a wrench including a head having a drive portion adapted to drive an object, with the wrench further including a handle having a first end interconnected to the head and a second end spaced from the first end along a longitudinal axis, with the second end of the handle including a receptacle extending in a radial direction perpendicular to the longitudinal axis, with the handle further including an annular groove on an outer periphery thereof and intermediate the first and second ends;

a resilient retaining member partially received in the annular groove of the handle;

an extension including a tubular member defining a longitudinal hole, with the longitudinal hole having an opening in an end of the tubular member, with the second end of the handle slideably and releasably received in the longitudinal hole along the longitudinal axis via the opening, with the tubular member having inner and outer peripheries spaced in the radial direction, with the tubular member further including a positioning hole extending from the inner periphery through the outer periphery of the tubular member and in communication with the longitudinal hole, with a spacing between the positioning hole and the opening along the longitudinal axis larger than a spacing between the receptacle and the annular groove along the longitudinal axis;

a positioning member slideably received in the receptacle in the radial direction;

a spring received in the receptacle, with the spring biasing the positioning member to partially extend through the positioning hole beyond the tubular member, coupling the second end of the handle with the tubular member, with a portion of the positioning member pressing against the inner periphery of the tubular member, with the positioning member being pushable in the radial direction to disengage from the positioning hole allowing disengagement of the tubular member from the handle, with an exposed portion of the retaining member outside of the annular groove of the handle pressing against the inner periphery of the tubular member when the extension is engaged with the handle.

2. The combination as claimed in claim 1, with the tubular member further including an annular retaining groove in the inner periphery of the tubular member and intermediate the positioning hole and the opening of the tubular member along the longitudinal axis, with the exposed portion of the retaining member received in the retaining groove when the extension is engaged with the handle.

3. The combination as claimed in claim 2, with the positioning member including a body and first and second sections, with the second section intermediate the first section and the body in the radial direction, with the body slideably received in the receptacle in the radial direction, with each of the first and second sections having first and second ends spaced in the radial direction, with the first end of the second section interconnected to the body, with the second section having an outer diameter smaller than the body and larger than a diameter of the positioning hole, with the first end of the first section interconnected to the second end of the second section, with the first section having an outer diameter smaller than the second section, with the first section slideably extending through the positioning hole in the radial direction, with the spring biasing the first section of the positioning member to extend through the positioning hole with the second end of the first section outside of the tubular member when the extension is engaged with the handle, with the second end of the second section and the first end of the first section forming a shoulder, with the shoulder pressing against the inner periphery of the tubular member when the extension is engaged with the handle, with the second end of the first section being pushable in the radial direction to disengage from the positioning hole allowing disengagement of the tubular member from the second end of the handle.

4. The combination as claimed in claim 3, with the retaining member being substantially C-shaped and including a limiting section and two engaging sections on opposite sides of the limiting section, wherein when the retaining member is outside of the tubular member, the two engaging sections are partially outside of the annular groove while the limiting section is completely received in the annular groove, and wherein when the retaining member is received in the tubular member, the inner periphery of the tubular member presses against the two engaging sections and urges the limiting section to expand radially outward to press against the inner periphery of the tubular member.

5. The combination as claimed in claim 1, with the positioning member including a body and first and second sections, with the second section intermediate the first section and the body in the radial direction, with the body slideably received in the receptacle in the radial direction, with each of the first and second sections having first and second ends spaced in the radial direction, with the first end of the second section interconnected to the body, with the second section having an outer diameter smaller than the body and larger than a diameter of the positioning hole, with the first end of the first section interconnected to the second end of the second section, with the first section having an outer diameter smaller than the second section, with the first section slideably extending through the positioning hole in the radial direction, with the spring biasing the first section of the positioning member to extend through the positioning hole with the second end of the first section outside of the tubular member when the extension is engaged with the handle, with the second end of the second section and the first end of the first section forming a shoulder, with the shoulder pressing against the inner periphery of the tubular member when the extension is engaged with the handle, with the second end of the first section being pushable in the radial direction to disengage from the positioning hole allowing disengagement of the tubular member from the second end of the handle.

6. The combination as claimed in claim 5, with the retaining member being substantially C-shaped and including a limiting section and two engaging sections on opposite sides of the limiting section, wherein when the retaining member is outside of the tubular member, the two engaging sections are partially outside of the annular groove while the limiting section is completely received in the annular groove, and wherein when the retaining member is received in the tubular member, the inner periphery of the tubular member presses against the two engaging sections and urges the limiting section to expand radially outward to press against the inner periphery of the tubular member.

* * * * *